Patented Oct. 8, 1929

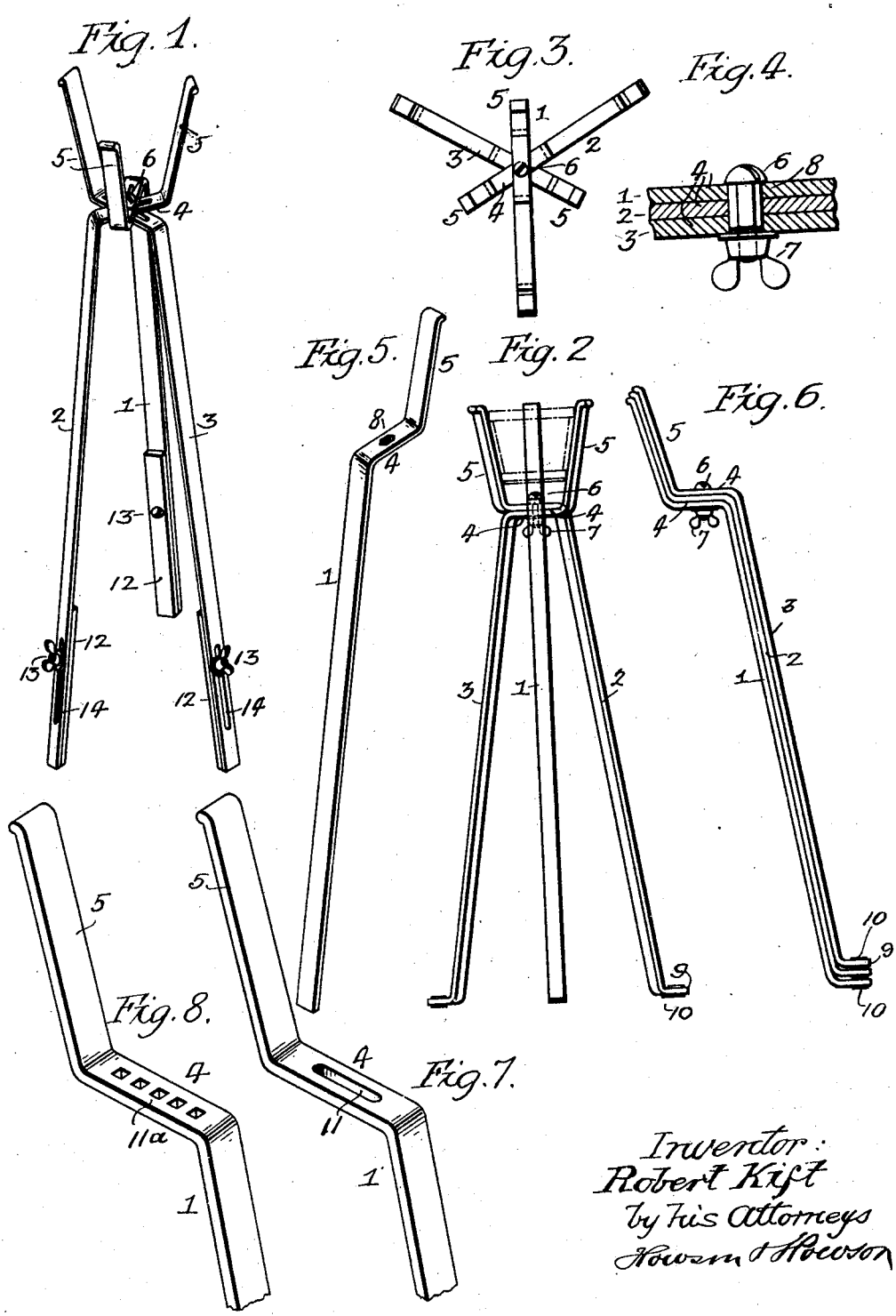

1,731,139

UNITED STATES PATENT OFFICE

ROBERT KIFT, OF PHILADELPHIA, PENNSYLVANIA

PLANT STAND

Application filed May 19, 1927. Serial No. 192,657.

The object of my invention is to provide a collapsible stand for potted plants, etc., used in decorating to present various decorative effects, which, when opened, will properly support the potted plants, and which can be collapsed to occupy a comparatively small space for transportation.

The invention also relates to certain other details fully described hereinafter.

In the accompanying drawing:

Fig. 1 is a perspective view of my improved plant stand provided with extension legs;

Fig. 2 is a side view of the stand, without the extension legs and opened to support a potted plant;

Fig. 3 is a plan view of Fig. 2;

Fig. 4 is an enlarged sectional view showing the securing bolt;

Fig. 5 is a detached perspective view of one of the members shown in Fig. 2;

Fig. 6 is a side view showing the legs nested;

Fig. 7 is an enlarged perspective view of the upper end of one of the legs, showing the slot for the securing bolt; and Fig. 8 is a perspective view of a modification of the invention.

In the present instance the stand is provided with three legs 1, 2 and 3. Each leg is made from a flat bar and bent to form a horizontal portion 4 and is again bent to form an inclined pot-holding portion 5. The portions 5, when the legs are assembled, form a basket in which the pots can be placed. The legs are attached together by a bolt 6 having a wing nut 7.

The holes 8 in the horizontal portions 4 are hexagonal in shape, and the body of the bolt 6 is hexagonal to fit the holes and thus hold the legs rigidly either in the opened position, as in Fig. 2, or in the nested position, as in Fig. 6.

By making the upper portion 5 of each leg inclined, pots of different sizes can be readily mounted in the stand, and the pots can be located at any angle desired.

As shown in Fig. 2, the lower end of each leg is preferably bent at an angle to the body of the leg to form a foot 9, and on the foot is a sleeve of rubber or other suitable material 10 to protect the floor or other surface from the metal parts of the stand.

In some instances it may be desirable to provide means for adjusting the upper end of the stand to accommodate pots that would not be properly held where the stand is not adjustable. I, therefore, slot the horizontal portions 4 of each leg as shown at 11, so as to allow the upper portion 5 to move towards or from the centre to accommodate certain sized pots. In place of the slots 11, the horizontal portions 4 may have a series of perforations 11$^a$, as shown in Fig. 8, to accomplish the same purpose.

In order that the legs of the stand may be adjusted, I provide sliding extensions 12. On each extension is a bolt 13 which passes through a slot 14 in the leg, and on the bolt is a wing nut. Thus one leg may be lengthened so that it will rest on a support below that of the other legs.

The stand being made of light and narrow material allows the placing of a potted plant directly under that supported by the stand, and the pots can be so nested around the stand as to effectually hide the stand from view when placed in a bank of decorative plants. The stand is particularly useful in decorating church or club festivals, funerals, banquets, and the like, and can be effectively used in store decorations, as well as for elevating plants from among others on green house benches to perfect their flowers and foliage.

I claim:

1. The combination in a plant stand, of three legs, each leg having a horizontal portion and an upper portion forming a basket for a pot containing a plant, the horizontal portion of each leg having a hexagonal hole therein; and a bolt having a hexagonal shank adapted to the openings in the legs, and holding the legs either in an extended position or in the nested position.

2. The combination in a plant stand, of a series of legs, each leg having an integral horizontal portion extending from the upper extremity of the leg; a pot-holding extension at the opposite end of the horizontal portion, each horizontal portion being perforated; and a pivot bolt extending through the perforations, said sections when folded being nested.

ROBERT KIFT.